Sept. 25, 1934.                E. W. DAVIS                1,974,449
                          LUBRICATING APPARATUS
                          Filed May 22, 1933           3 Sheets-Sheet 1
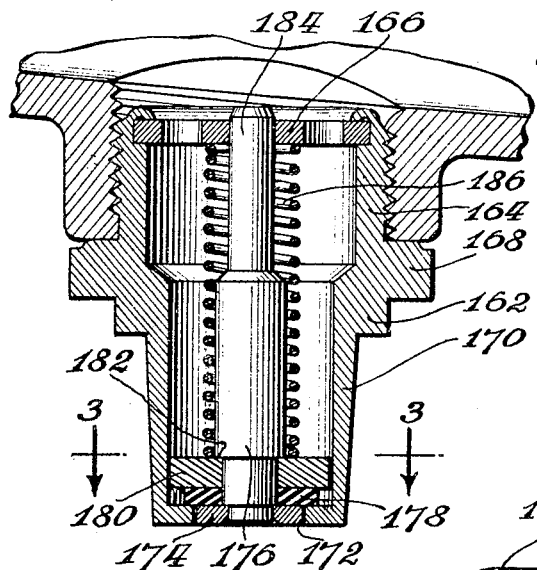
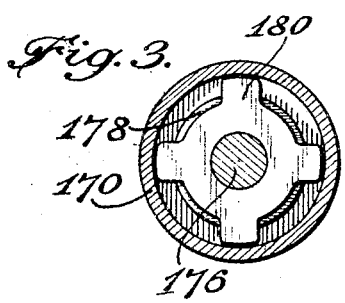
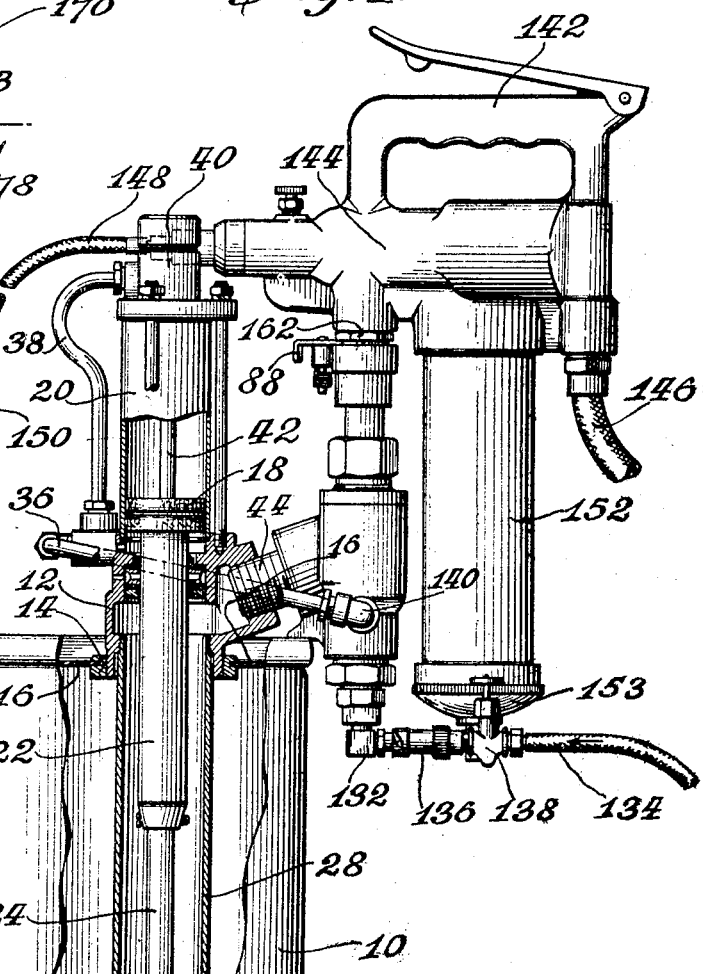
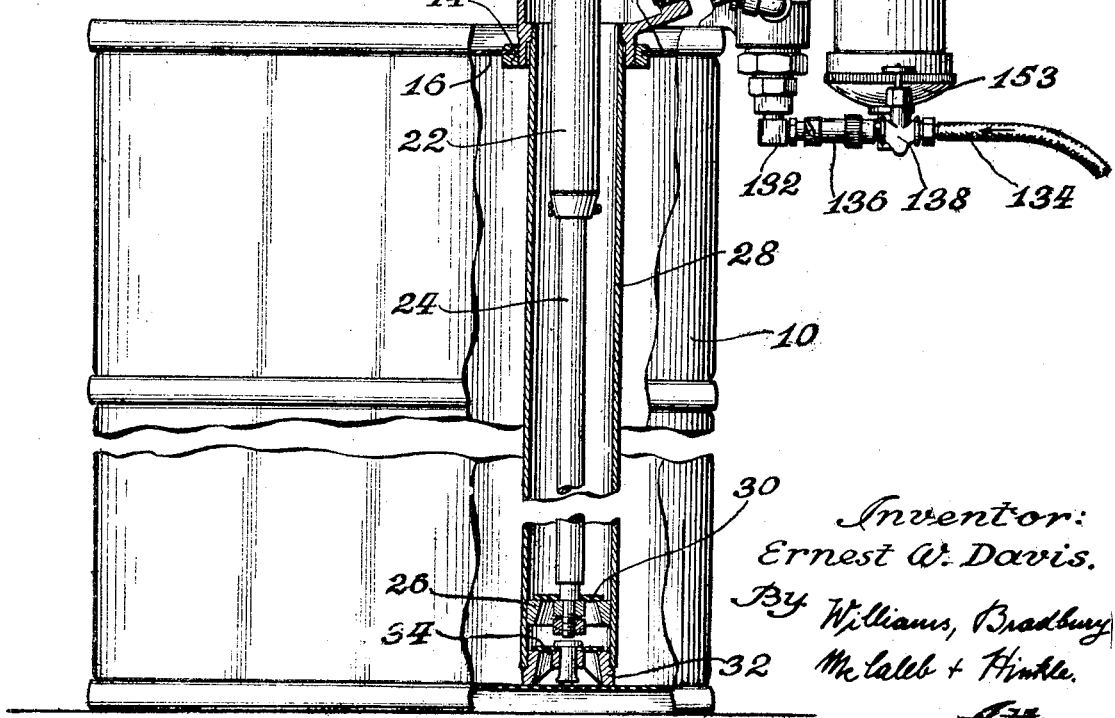
Inventor:
Ernest W. Davis.
By Williams, Bradbury,
McCaleb + Hinkle.
Attys.

Sept. 25, 1934.　　　　E. W. DAVIS　　　　1,974,449
LUBRICATING APPARATUS
Filed May 22, 1933　　　　3 Sheets-Sheet 2
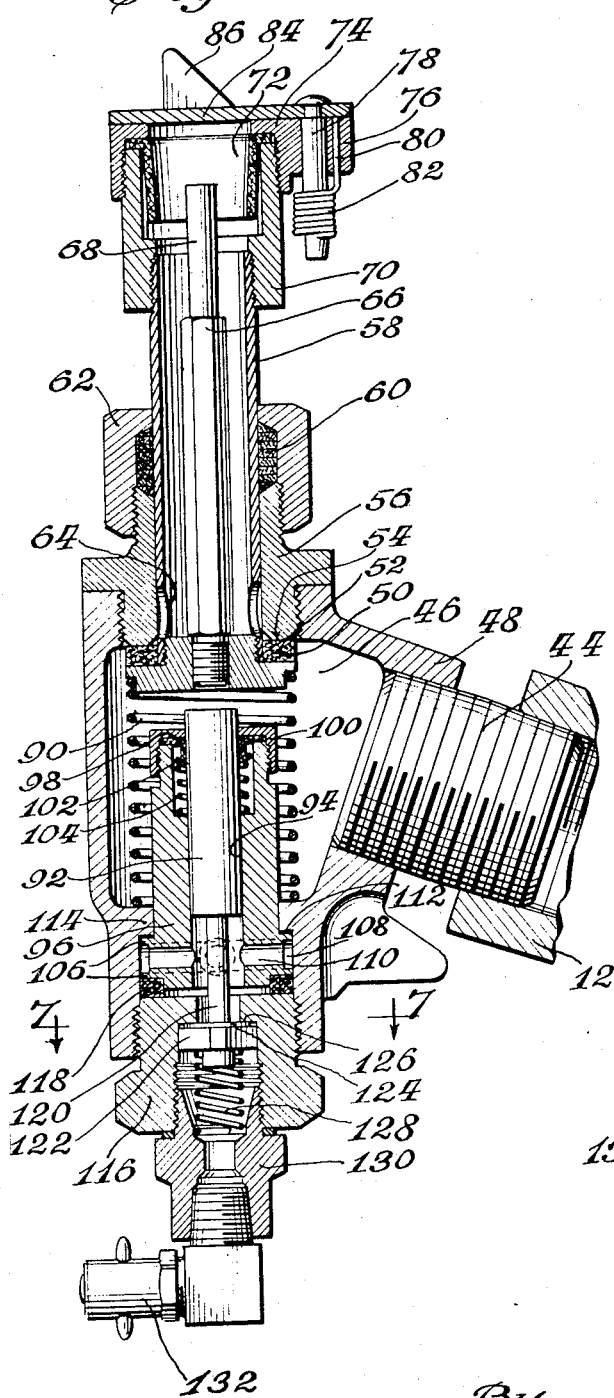
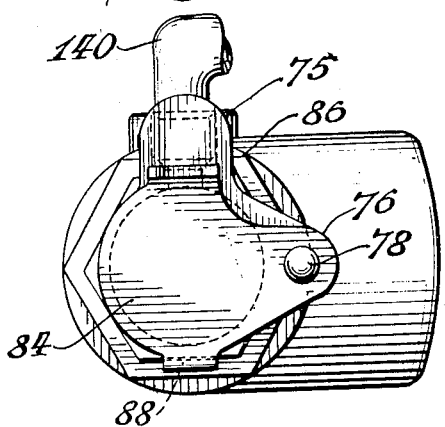
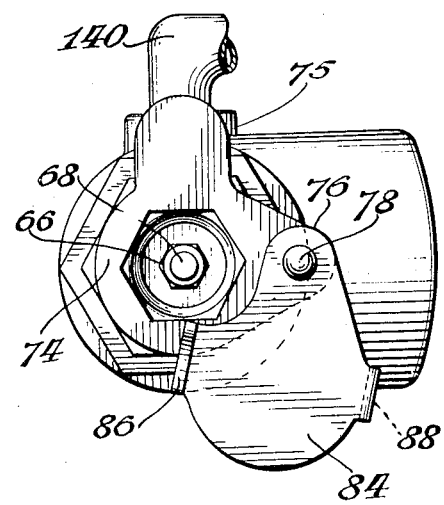
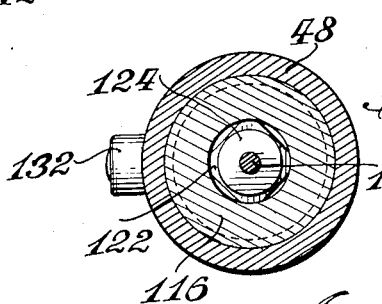
Inventor:
Ernest W. Davis.
By
Williams, Bradbury, McCaleb & Hinkle
Attys.

Sept. 25, 1934.   E. W. DAVIS   1,974,449
LUBRICATING APPARATUS
Filed May 22, 1933   3 Sheets-Sheet 3
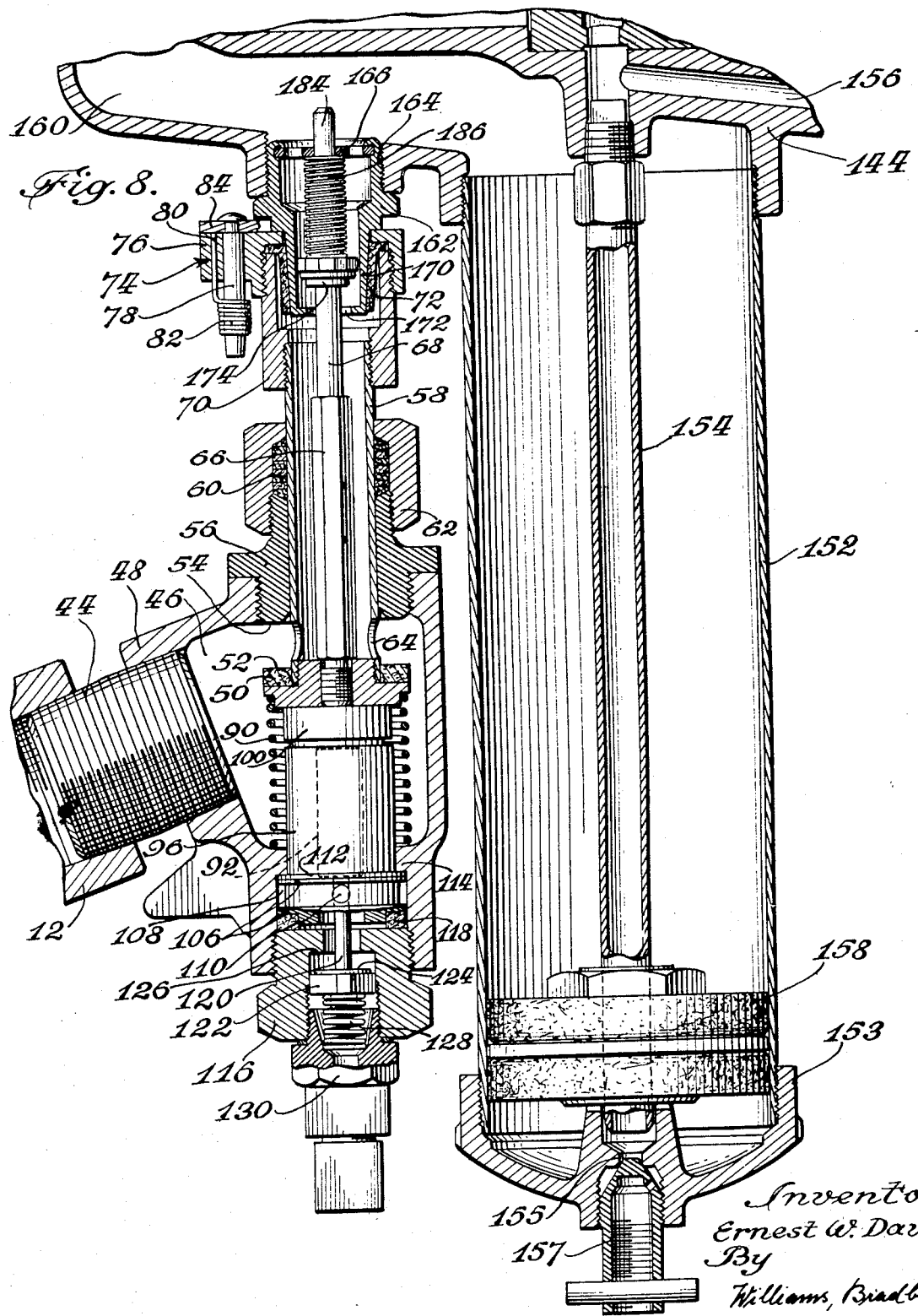

Patented Sept. 25, 1934

1,974,449

UNITED STATES PATENT OFFICE 1,974,449

LUBRICATING APPARATUS

Ernest W. Davis, Oak Park, Ill., assignor to Alemite Corporation, Chicago, Ill., a corporation of Delaware Application May 22, 1933, Serial No. 672,106

16 Claims. (Cl. 221—47.5)

My invention relates generally to lubricating apparatus, and more particularly to improved means for filling lubricant compressors.

One of the most disagreeable and time-consuming operations in conducting an automobile lubricating service station is the refilling of the lubricant compressors or grease guns. This is also one of the most likely sources of contamination of the lubricant as the operation is generally carried out.

It is an object of my invention to provide an improved system for filling the lubricant reservoirs of grease guns and lubricant compressors.

A further object is to provide a power operated means for filling lubricant compressors having means actuated by the lubricant compressor to be filled to control the operation of the power operated filling device.

A further object is to provide an improved double valve mechanism for controlling the flow of power fluid to a lubricant pump and simultaneously controlling the flow of lubricant from the pump to a compressor to be filled.

A further object is to provide an improved form of detachable lubricant tight connection for use in filling mechanisms for lubricant compressors.

Other objects will appear from the following description, reference being had to the accompanying drawings, in which:

Figure 1 is a side elevation of the lubricant compressor and filling mechanism, portions of the latter being shown in vertical section;

Figure 2 is a central vertical sectional view of the lubricant receiving fitting attached to the lubricant compressor to be filled;

Figure 3 is a transverse sectional view of said fitting taken on the line 3—3 of Fig. 2;

Figure 4 is an enlarged central vertical sectional view of the double valve for controlling the flow of power fluid to the lubricant pump and also controlling the flow of lubricant to the lubricant compressor being filled;

Figure 5 is a plan view of the valve mechanism shown in Fig. 4, with the cover in normal position;

Figure 6 is a view similar to Fig. 5 showing the cover in open position;

Figure 7 is a transverse sectional view taken on the line 7—7 of Fig. 4; and

Figure 8 is a central vertical sectional view of the double valve mechanism and a portion of a lubricant compressor, showing the latter connected to the former and showing the valves in open position.

The pump and compressor filling mechanism shown in Fig. 1 comprises a lubricant containing drum 10 which is preferably the original container in which the lubricant is purchased. A lubricant pumping mechanism comprises a body 12 threaded into a ring 14 secured to the top 16 of the container 10. The pumping mechanism comprises an air operated piston 18 reciprocable in an air motor cylinder 20.

The piston 18 has a stem 22 and rod 24 connected thereto, the connection between the stem 22 and rod 24 being preferably a relatively loose connection so as to obviate the necessity of perfect alignment between the piston 18 and a piston 26 secured to the lower end of the rod 24. The piston 26 is reciprocable in a cylinder 28 and has a plurality of openings adapted to be closed by an annular check valve 30. The lower end of the cylinder 28 is closed by a foot valve body 32 having a check valve 34 cooperable therewith. The piston 18 is reciprocated by compressed air supplied through a conduit 36 which in turn communicates with a conduit 38 leading to a valve chamber 40. The valve mechanism within this chamber is actuated by a stem 42 secured to the piston 18 alternately to connect the upper end of the cylinder 20 with the atmosphere and with the conduit 38 through which the compressed air is supplied. The lower end of the cylinder is preferably connected to the source of compressed air at all times.

The above described pump mechanism is not claimed herein, but is shown in greater detail and claimed in my copending application Serial No. 611,495, filed May 16, 1932.

As more clearly shown in Figs. 4 and 8, the lubricant ejected upon the upward stroke of the piston 26 is forced through a pipe nipple 44 threaded in the body casting 12 into a chamber 46 formed in a valve body 48. Escape of lubricant from the chamber 46 is prevented by a valve 50 having an annular sealing facing 52 engageable with a seat 54 formed on the inner end of a bushing 56. A tubular sleeve 58 is threaded to the valve 50 and is guided in the cylindrical bore of the bushing 56, the escape of lubricant between the sleeve 58 and the bushing being prevented by suitable packing 60 held in place by a packing nut 62. The sleeve 58 has a plurality of ports 64 formed adjacent the valve 50 so that when the latter is moved away from its seat lubricant may flow through these ports into the sleeve 58.

A valve opening pin 66 is threaded in the valve 50 and has a small diameter cylindrical end portion 68. A coupler for making a detachable connection with the lubricant receiving fitting is secured to the upper end of the sleeve 58 and comprises a member 70 having a flange washer 72, preferably of leather, clamped thereto by an internally threaded top 74. The latter is provided with a sidewardly extending shelf portion 75 and a sidewardly extending boss 76 which is drilled to receive a pin 78 and the one end 80 of a torsion spring 82, the other end of which is anchored in the pin 78. A cover 84 is tightly riveted to the pin 78, the cover being adapted to be swung to the side as indicated in Fig. 6. To facilitate the sideward swinging of the cover 84 to open position, the cover is provided with an upwardly projecting triangular lug 86. The cover also has a short downwardly extending lug 88 which, by engagement with the edge of the top 74, limits the swinging movement of the cover under the influence of the torsion spring 82.

The valve 50 together with the sleeve 58 and all parts associated therewith is normally held in its uppermost position as shown in Fig. 4 with the valve 50 closed, by a compression spring 90. Upon initial downward movement of the sleeve 58 the valve unseats to permit flow of lubricant into the sleeve 58 and hence to the lubricant compressor being filled, as will hereinafter be described, and thereafter the valve 50 is adapted to engage a plunger 92 which is guided for vertical reciprocation in a bore 94 formed in a plunger guide 96. A flanged leather gasket 98 has its flange clamped to the upper end of the plunger guide 96 by a cap nut 100, the cylindrical portion of the leather gasket being held tightly pressed against the plunger by a dished washer 102 which is forced upwardly against the leather gasket by a spring 104.

The plunger guide 96 has a pair of sidewardly extending flanges 106 adjacent its lower end, the space between these flanges forming annular groove 108 which is connected by a plurality of drilled holes 110 with the bore 94. A gasket 112 is located between the upper flange 106 and an inwardly projecting shoulder 114 formed in the valve body 48. The plunger guide 96 is held in the body 48 by a bushing 116, a suitable gasket 118 being located between the lower flange 106 of the plunger guide 96 and the bushing 116 to prevent the leakage of air. The plunger 92 has a reduced diameter portion 120 at its lower end to which is secured a backing piece 122 for an air admission valve 124. The valve 124 is normally held against a valve seat 126 formed in the bushing 116 by a compression coil spring 128, the lower end of which rests in a suitable socket formed in a fitting 130 which is threaded into the bushing 116. A so-called angle pin fitting 132 is threaded in the fitting 130. The pin fitting may be of the type illustrated in the Patent to Gullborg, No. 1,307,734 and is adapted to have a compressed air supply hose 134 connected thereto by means of a coupler 136, the latter being likewise illustrated in the aforesaid patent to Gullborg. A shut-off valve 138 is provided to cut off the supply of compressed air to the pumping mechanism when the pump is not to be used for an extended period of time. The conduit 36, by which the compressed air is conducted to the air motor of the lubricant pump, is connected by means of a pipe elbow 140 with the body 48 so as to communicate with the annular groove 108, and hence through the drilled holes 110 with the lower end of the bore 94.

The lubricant compressor to be filled is illustrated as of the portable power operated type comprising a handle 142 formed integrally with a casting 144 in which is contained a compressed air motor supplied with air under pressure through a conduit 146. The lubricant compressor illustrated has a discharge conduit 148 terminating in a suitable coupler 150 which is adapted to be successively connected to lubricant receiving fittings attached to the bearings to be lubricated.

As illustrated in Fig. 8 the compressor comprises a barrel 152, the lower end of which is closed by a cap 153 and the upper end of which is threaded in the body 144 of the compressor. The cap 153 has a vent opening 155 closed by a valve 157 threaded in the cap. A tube 154 is secured to the body 144 so as to communicate with the passageway 156 formed in the latter, which forms a path for the supply of compressed air for the operation of the air motor contained in the body casting 144.

The lower end of the tube 154 communicates with the end of the barrel 152 to supply compressed air to force a double cup leather piston 158 upwardly. The piston 158 is guided on the tube 154 and is provided with means to prevent leakage of air between it and said tube. The space within the barrel 152 above the piston 158 is normally filled with lubricant which is forced by the piston 158 through a channel 160 formed in the compressor body 144 to the lubricant cylinder of the compressor. A compressor similar to that partially illustrated herein is disclosed in my copending application Serial No. 657,497, filed February 20, 1933. It will of course be understood that the filling mechanism may be used with any suitable lubricant compressor, and that the compressor per se is not claimed herein.

The lubricant compressor is provided with an inlet nipple 162 which is preferably threaded into the body 144 and communicates with the channel 160. As shown in detail in Figs. 2 and 3, this nipple comprises a threaded shank portion 164, the inner end of which is crimped over an apertured disc 166, a hexagonal flange portion 168 and a tapered tip 170. The tip has an inlet opening 172 which is normally substantially filled by a head 174 riveted to a valve stem 176, and which holds a sealing washer 178 against a valve backing and guide plate 180. The guide plate is held against a shoulder 182 formed on the stem 176, and as shown in Fig. 3, has its peripheral edge recessed to permit the lubricant to flow past it. The valve stem 176 has a portion 184 of reduced diameter which is guided for reciprocation in the disc 166. A compression coil spring 186 surrounding the stem 176 is seated between the disc 166 and the plate 180 and normally presses the valve 178 firmly against its seat.

The operation of filling the lubricant compressor is merely by inserting the tip 170 of the fitting 168 on the compressor into the coupler and pressing downwardly, whereupon the admission valve for the supply of compressed air to the power operated pump will be opened, and at the same time the valve 50 which controls the discharge of lubricant will be opened and the barrel 152 of the compressor rapidly filled. In detail the operation is as follows.

At the beginning of the day's operations, the service station attendant will condition the apparatus for use by opening the shut-off valve 138. Then the compressor to be filled is positioned substantially as shown in Fig. 1 with the end of the nipple 162 resting upon the shelf 75 of the top 74. By pushing sidewardly the nipple will engage the triangular projection 86 formed on the cover 84 and the cover swung to the position substantially as shown in Fig. 6. The end of the nipple will then drop into the socket formed in the member 70 and as it is pressed downwardly the flange 162 thereof will engage the inclined edge of the projection 86 and swing the cover 84 further so that the nipple may drop to the position shown in Fig. 8. Thereafter, as the compressor and nipple are forced downwardly the end 68 of the rod 66 engages the valve head 174 in the nipple and forces the valve upwardly to the position shown in Fig. 8. At the same time the sleeve 58 will be depressed to the position shown in Fig. 8, thus first opening the valve 50 and later, after the valve 50 has contacted with the end of the plunger 92, opening the air admission valve 124. When the latter has been opened the air under pressure supplied through the hose 134 flows through the coupler 136 and nipple 132 past the valve 124 through the bore 94, holes 110 and annular groove 108 to the elbow 140 and conduit 36.

As soon as air under pressure is supplied to the air motor the poiston 18 will commence reciprocating, its piston 30 pumping lubricant through the nipple 44 into the valve chamber 46 and thence through the ports 64 into the sleeve 58. The lubricant pressure will force the flange leather 72 firmly against the tapered surface of the tip 170 of the nipple attached to the compressor, forming a lubricant tight seal therewith. The lubricant flowing into the barrel 152 will move the piston 158 downwardly, the air beneath the piston being vented if desired by opening the vent valve 157. When the barrel has been completely filled the slowing up and ultimate stopping of the operation of the pump will apprise the attendant of this fact, and the compressor may be removed and disconnected from the filling mechanism merely by lifting the nipple 162 from the socket of the coupling whereupon the cover 84 will immediately spring back in place, covering the opening and prevent pollution of the grease with foreign matter. Upon raising the nipple and compressor from the coupler, the springs 90 and 128 will force the valves 50 and 124 respectively to their seats, thus preventing the escape of grease from the coupler after the compressor has been removed, and shutting off the supply of air to the pumping mechanism.

With the above described mechanism the operation of filling a lubricant compressor is greatly simplified, and the time taken for the operation greatly reduced. It will be noted that at no time is the lubricant supplied to the compressor in contact with the atmosphere, and that there is thus no opportunity for dirt or other foreign matter to become mixed with the lubricant to interfere with its lubricating qualities.

While I have shown and described a particular embodiment of my invention, it will be readily understood by those skilled in the art that variations may be made in the constructions disclosed without departing from the basic features of my invention. I therefore do not wish to be limited to the precise construction disclosed, but wish to include within the scope of my invention all such modifications and variations which will readily suggest themselves.

What I claim as new and desire to secure by United States Letters Patent, is:

1. A lubricant transferring mechanism comprising a power operated lubricant pump having a valve controlled discharge conduit, a lubricant compressor to be filled with lubricant, means on the discharge conduit of the pump and on said compressor for making a quick detachable lubricant tight connection therebetween, means to control the application of power to said pump, and means to open the valve in said discharge conduit and actuate said controlling means, said means being operated incidental to the connection of said compressor to said discharge conduit.

2. Lubricating apparatus comprising a comprising a compressed air motor operated pump for transferring lubricant from a container to a lubricant compressor, a nipple on the lubricant compressor to be filled, said pump having a discharge port provided with coupling means for making a quick detachable connection with said nipple on the lubricant compressor, a valve to control the flow of lubricant from said pump to the compressor, a valve to control the flow of compressed air to the motor of the pump mechanism, and means operated incidental to connecting the compressor with said coupling means for opening said valves.

3. Lubricating apparatus of the class described comprising a power operated lubricant pumping mechanism, a lubricant compressor having a reservoir to be filled, means on said pumping mechanism and said compressor for detachably coupling the latter to the reservoir of the former, a valve to control the flow of lubricant to the reservoir of said compressor, means to control the operation of said power operated pumping means, and means operable upon connecting the lubricant compressor to said pumping mechanism to open said valve and operate said control means to initiate operation of said lubricant pumping mechanism.

4. Lubricating apparatus of the class described comprising a power operated pumping mechanism, means for detachably connecting a lubricant compressor to said mechanism for filling thereby, and means operable upon connecting a lubricant compressor to said mechanism to initiate the application of power thereto for the operation thereof.

5. Lubricating apparatus of the class described comprising a power operated multi-stroke pumping mechanism having a discharge valve, a lubricant compressor, a valved nipple carried by said compressor for detachably connecting said lubricant compressor to said mechanism, and means operable upon connecting the lubricant compressor to said mechanism to open the valve in said nipple, to open said discharge valve, and thereafter to initiate operation of said pumping mechanism.

6. Lubricating apparatus of the class described comprising a power operated multi-stroke pumping mechanism having a discharge valve, means for detachably connecting a lubricant compressor to said mechanism, and means operable upon connecting the lubricant compressor to said mechanism to open said discharge valve and thereafter to initiate operation of said pumping mechanism.

7. Lubricating apparatus of the class described comprising a power operated lubricant pumping mechanism, a lubricant compressor having a reservoir to be filled, means on said pumping mechanism and said compressor for detachably coupling the latter to the reservoir of the former, a valve to control the flow of lubricant to the reservoir of said compressor, means to control the operation of said power operated pumping means, and means operable by movement of the compressor upon connecting it to said pumping mechanism first to open said valve and thereafter upon further movement of said compressor to operate said control means to initiate operation of said lubricant pumping mechanism.

8. A lubricant container filling mechanism comprising a power operated lubricant pump, an outlet for said pump having an outlet valve therein, a container to be filled with lubricant, means on the discharge conduit of the pump for making a quick detachable lubricant-tight connection with said container, means to control the operation of said pump, and means operated incidental to the connection of said container to the outlet of said pump to open said outlet valve and actuate said controlling means.

9. Lubricating apparatus comprising a pressure fluid motor operated pump for discharging lubricant from a drum to a lubricant compressor to be filled, a nipple on the lubricant compressor, said pump having a discharge port provided with coupling means for making a quick detachable connection with said nipple, a valve to control the flow of lubricant from said pump to the compressor, a valve to control the flow of pressure fluid to the motor of the pump, and means operated incidental to connecting the compressor nipple with said coupling means for opening said valves.

10. Lubricating apparatus of the class described comprising a pressure fluid operated lubricant pumping mechanism, a lubricant compressor having a reservoir to be filled, means on said pumping mechanism and said compressor for detachably coupling the latter to the former, a valve to control the flow of lubricant to the reservoir of said compressor, a valve to control the flow of pressure fluid to said pumping means, and means operable upon connecting the lubricant compressor to said pumping mechanism to open said first named valve and threafter to open said last named valve to initiate operation of said lubricant pumping mechanism.

11. Lubricating apparatus of the class described comprising a power operated pumping mechanism, a lubricant compressor, means for detachably connecting said compressor to said mechanism, and means operated by movement of said compressor after it has been connected to said mechanism to initiate operation of said pumping mechanism.

12. A control device for lubricant pumping mechanisms, comprising a body having a chamber and being constructed and arranged to be connected to the outlet of the lubricant pumping mechanism, said chamber having an outlet, a spring pressed valve normally closing said outlet, means for making a sealed connection with a lubricant compressor to be filled, said means being operatively connected to said valve, means for controlling the operation of the lubricant pumping mechanism, and a plunger for operating said means, said plunger projecting into said chamber and arranged to be moved by said valve after the latter has moved a predetermined distance from its seat.

13. A control device for lubricant pumping mechanisms, comprising an outlet for said pumping mechanism having a valve therein, means for making a quick detachable sealed connection between the reservoir of a lubricant compressor to be filled and said outlet, means associated with said outlet operable to open said valve incidental to connecting a lubricant compressor to said outlet, a control device for the pumping mechanism, and means actuated by said valve to operate said control means.

14. In combination, a pressure fluid operated lubricant pumping mechanism having an outlet, means associated with said outlet for making a quick detachable connection with a lubricant compressor, a valve for controlling the flow of lubricant through said outlet and operated through said means, a valve for controlling the flow of pressure fluid to said lubricant pumping mechanism, and means actuated by said first named valve to open the fluid pressure controlling valve after said first named valve has opened a predetermined extent.

15. In combination a compressed air operated lubricant pumping mechanism, a valve for controlling the flow of compressed air to said mechanism, an outlet valve to control the flow of lubricant pumped by said mechanism, means for opening said outlet valve, and means controlled by said outlet valve for opening said compressed air valve after the outlet valve has opened to a predetermined extent.

16. A control device for lubricant pumping mechanisms comprising, a body having a chamber and being constructed and arranged to be connected to the outlet of the lubricant pumping mechanism, said chamber having an outlet, a spring pressed valve normally closing said outlet, means for making a sealed connection with a lubricant compressor to be filled, said means being operatively connected to said valve, whereby said valve may be opened by a force applied to said connecting means, means for controlling the operation of the lubricant pumping mechanism, and mechanical means for operating said controlling means, said mechanical means being actuated upon a predetermined movement of said connecting means.

ERNEST W. DAVIS.